Feb. 27, 1923.
A. V. VERVILLE
AMBULANCE AIRCRAFT FUSELAGE
Filed Apr. 18, 1922
1,446,528
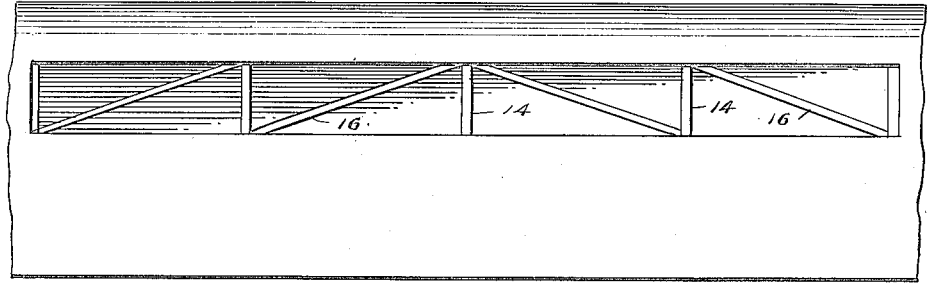
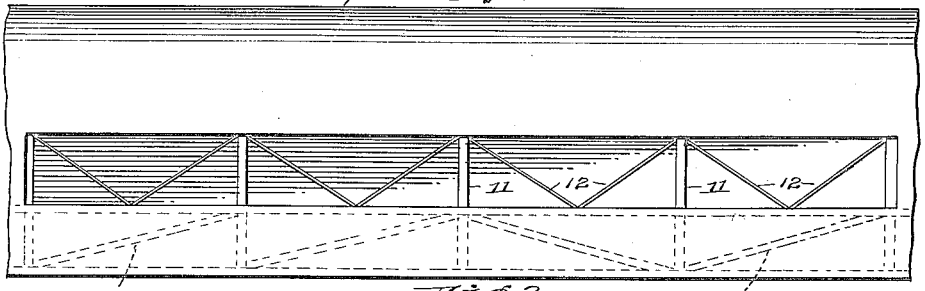
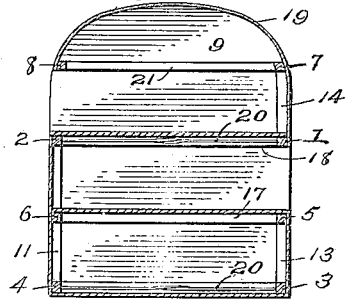
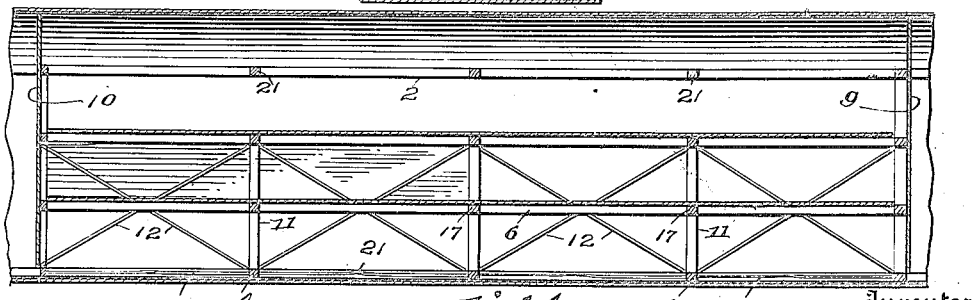
Inventor
A. V. Verville
By Robert H Young
Attorney Patented Feb. 27, 1923.

1,446,528

UNITED STATES PATENT OFFICE.

ALFRED V. VERVILLE, OF DAYTON, OHIO.

AMBULANCE AIRCRAFT FUSELAGE.

Application filed April 18, 1922. Serial No. 555,307.

*To all whom it may concern:*

Be it known that I, ALFRED V. VERVILLE, a citizen of the United States, residing at Dayton, in the county of Montgomery and State of Ohio, have invented certain new and useful Improvements in Ambulance Aircraft Fuselages, of which the following is a specification.

This invention relates to aircraft and especially to the construction of a body or fuselage designed to receive and carry one or more litters upon which are placed wounded or sick patients.

The object of the invention is to produce a practical ambulance fuselage having the requisite factor of strength and safety while adapted to receive and transport one or more litters and their loads, the fuselage having one or more litter-receiving compartments with entrances thereto in the side or sides of the fuselage.

With the above and other objects in view, the invention consists in the novel construction, combination and arrangement of parts herein fully described, illustrated and claimed.

In the accompanying drawings,

Figure 1 is a side elevation of the fuselage.

Figure 2 is an opposite side elevation of the fuselage,

Figure 3 is a cross section through the fuselage; and

Figure 4 is a longitudinal section through the fuselage.

In the ordinary trussed frame work fuselage as now constructed, use is made of two main upper longérons 1 and 2 and two main lower longérons 3 and 4. Said longérons are usually connected by transverse members or struts and the whole frame braced by truss-members, generally wires or cables. Such a construction does not admit of the formation of openings in the walls of the fuselage of sufficient dimensions to allow large objects such as litters and their loads to be placed in the fuselage and removed therefrom.

In carrying out this invention, two auxiliary lower longérons 5 and 6 are placed about midway between (vertically) the main upper and lower longérons 1, 2, and 3, 4, and two auxiliary upper longérons 7 and 8 are placed above the main upper longérons 1 and 2. All longérons are fastened to bulkheads 9 and 10, which may be of plywood, said bulkheads being at the front and rear of the litter-carrying section of the fuselage.

On one side of the fuselage, transverse members or struts 11 connect the longérons 2, 4 and 6, while bracing or trussing members 12, such as wires or cables extend diagonally between said longérons and struts forming a well braced fuselage side wall. The space between the longérons 2 and 8 on that side of the fuselage is left clear and open to admit a litter and its load.

On the opposite side of the fuselage, the longérons 3 and 5 are connected by transverse members or struts 13. Likewise the longérons 1 and 7 are connected by transverse members or struts 14. Diagonal bracing members 15 extend between the longérons 3 and 5, and other bracing members 16 extend between the longérons 1 and 7. The space between the longérons 1 and 5 is left free and unobstructed so that a litter and its load may pass through that side of the fuselage.

Floor supports 17 extend transversely of the fuselage and connect the longérons 5 and 6. Similar floor supports 18 connect the longérons 1 and 2. A hood 19 is supported by the auxiliary upper longérons 7 and 8.

By reason of construction described, a strong, light weight fuselage structure is obtained adapted to receive through lateral openings therein one or more litters and their loads. The litter-receiving compartments are arranged one above another and the entrances thereto are in opposite sides of the fuselage. It is to be understood, of course, that the fuselage is covered with fabric or other material and that provision is made in such covering for giving access to the litter-receiving compartments, such as doors or removable cover sections. Additional cross trussing or bracing members 20 and 21 are used wherever necessary.

What I claim is:

1. An aircraft fuselage having in each side thereof a litter receiving opening, said openings being located at different elevations.

2. An aircraft fuselage having two litter-receiving compartments located one above the other and also formed to adapt one litter to be inserted through one side of the fuselage and another litter to be inserted through the opposite side of the fuselage.

3. An aircraft fuselage having two litter-receiving compartments located one above the other and also formed to adapt one litter to be inserted through one side of the fuselage and another litter to be inserted through the opposite side of the fuselage, and floor supporting frame bracing members for each of said compartments.

4. An aircraft ambulance fuselage, comprising a litter-carrying section embodying front and rear bulkheads, main upper and lower longérons extending between said bulkheads, auxiliary longérons between said main upper and lower longérons, other auxiliary longérons above the main upper longérons, transverse bracing members connecting the main upper and lower longérons on one side of the fuselage, transverse bracing members connecting the main upper longéron and auxiliary upper longérons on the opposite side of the fuselage, and transverse bracing members connecting the main lower longéron and auxiliary lower longéron on the last named side of the fuselage.

In testimony whereof I affix my signature.

ALFRED V. VERVILLE.